United States Patent
Sun et al.

(10) Patent No.: US 9,501,671 B2
(45) Date of Patent: Nov. 22, 2016

(54) BARCODE AND ELECTRONIC TAG READER

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/583,125

(22) Filed: Dec. 25, 2014

(65) Prior Publication Data

US 2015/0213292 A1     Jul. 30, 2015

(30) Foreign Application Priority Data

Jan. 24, 2014   (CN) .......................... 2014 1 0033328

(51) Int. Cl.
   *G06K 7/10* (2006.01)
   *G06K 7/00* (2006.01)

(52) U.S. Cl.
   CPC ......... *G06K 7/0004* (2013.01); *G06K 7/10009* (2013.01); *G06K 7/10544* (2013.01)

(58) Field of Classification Search
   CPC ........................ G06K 7/10861; G06K 7/1097
   USPC ............. 235/462.01, 462.14, 462.46, 472.02
   See application file for complete search history.

(56) References Cited

U.S. PATENT DOCUMENTS

| | | | |
|---|---|---|---|
| 5,237,161 A * | 8/1993 | Grodevant | G06K 7/10881 235/462.31 |
| 8,740,086 B2 * | 6/2014 | Handshaw | G06K 7/12 235/440 |
| 2012/0145793 A1 * | 6/2012 | Kearney | G06K 7/109 235/472.02 |

* cited by examiner

*Primary Examiner* — Daniel St Cyr
(74) *Attorney, Agent, or Firm* — Zhigang Ma

(57) ABSTRACT

A reader includes a body and a scan member. The body includes a scan zone configured for placing at least one barcode and an electronic tag. The scan member is mounted on the body and is aligned to the scan zone. The scan member includes a barcode reading module and a RFID reader module. The barcode reading module reads barcode information from the barcodes; the RFID reader module reads electronic information from the RFID tag and writes the barcode information into the electronic tag.

10 Claims, 3 Drawing Sheets

BARCODE AND ELECTRONIC TAG READER

FIELD

The subject matter herein generally relates to a reader, and particularly relates to a reader capable of reading barcodes and electronic tags.

BACKGROUND

Radio frequency identification (RFID) technology is widely used on products and has a high data security advantage. On the other hand, barcodes are also widely used on products and have a low cost advantage. Due to both the RFID and barcodes being synchronously used on the market, a reader that reading information from both RFID and barcodes is needed.

BRIEF DESCRIPTION OF THE DRAWINGS

Implementations of the present technology will now be described, by way of example only, with reference to the attached figures.

DETAILED DESCRIPTION

Figure 1:
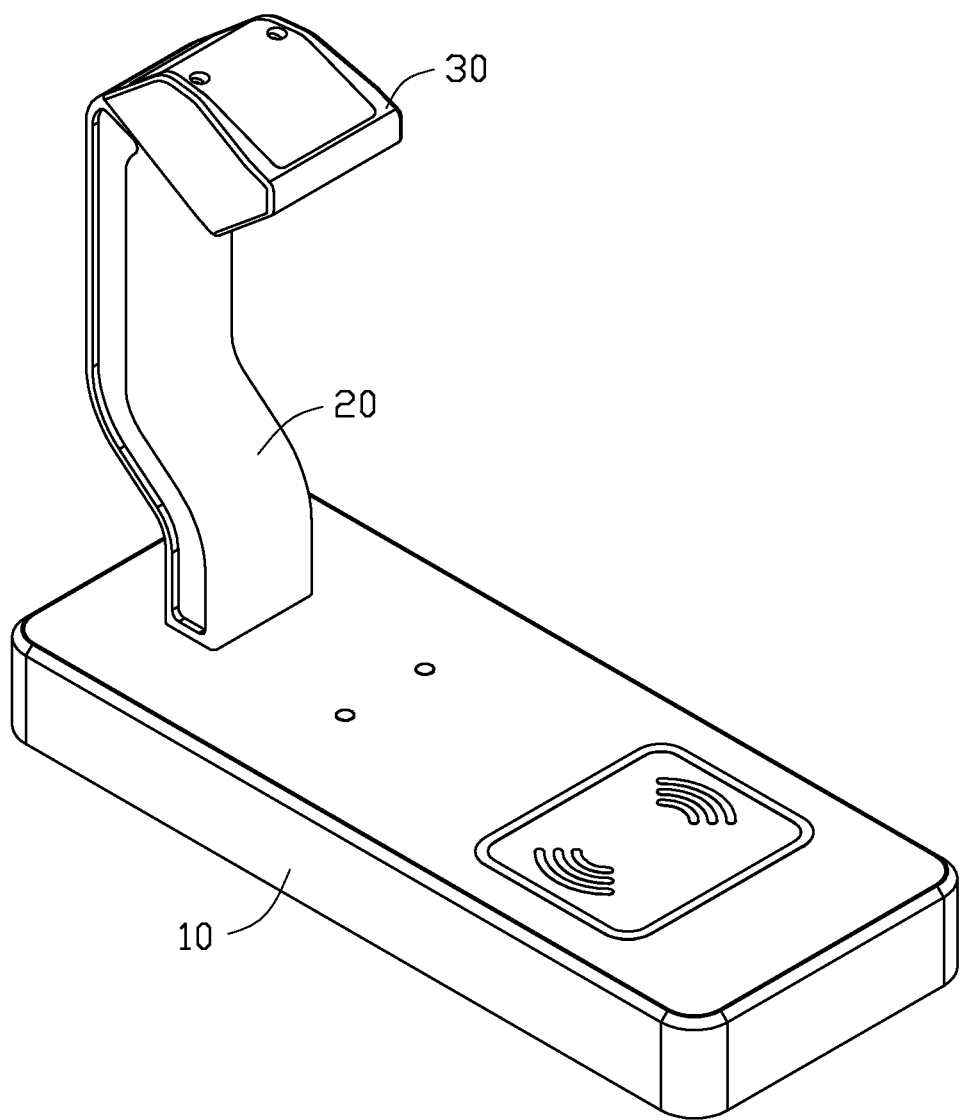
FIG. 1 is an isometric view of an embodiment of a reader.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
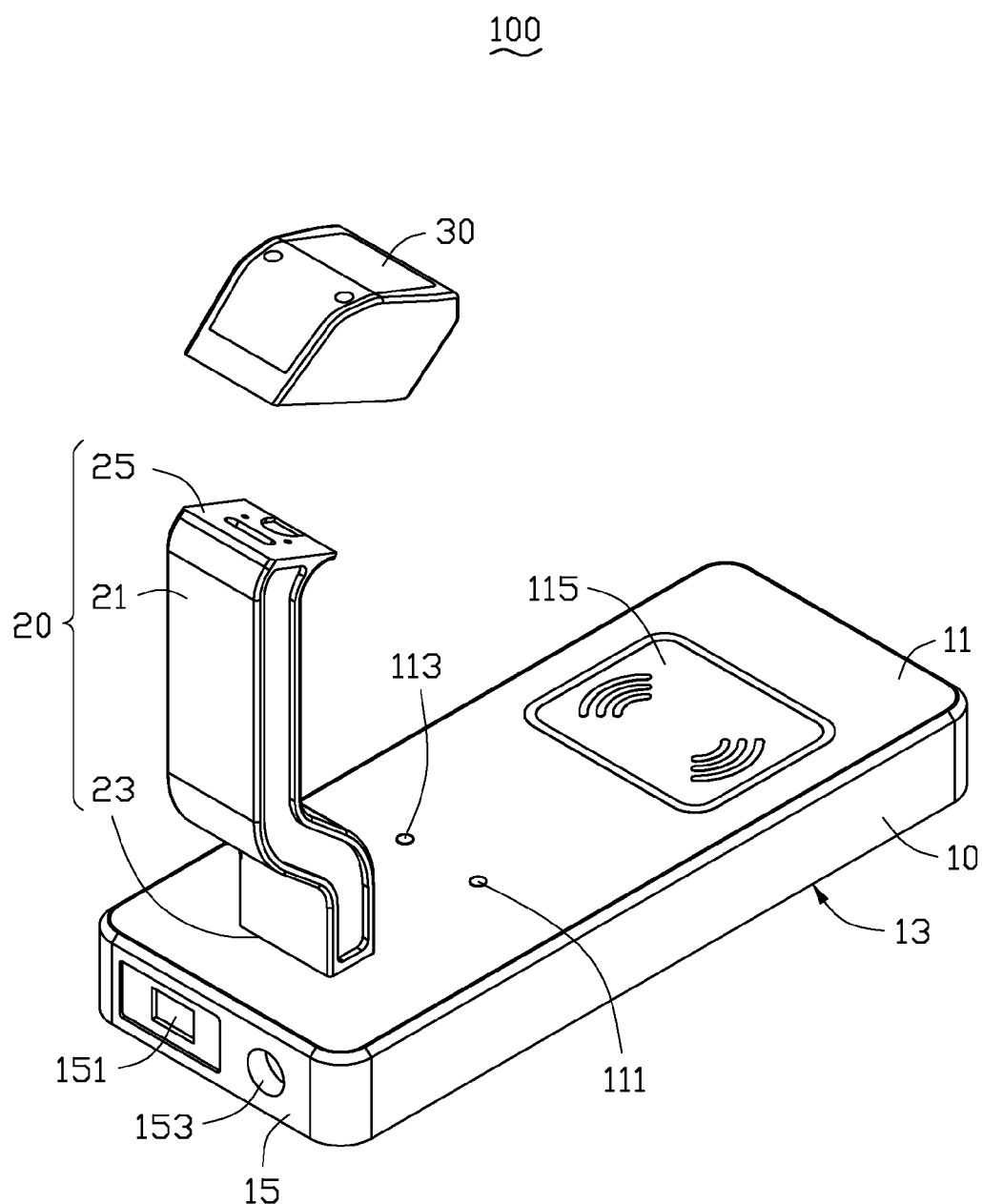
FIG. 2 is a partially exploded isometric view of the reader of FIG. 1.

FIGS. 1 and 2 illustrate at least one embodiment of a reader 100 configured for reading information of barcodes and electronic tags, and writing the information of the barcodes to the electronic tags. The electronic tags may be radio frequency identification (RFID) tags.

The reader 100 includes a body 10, a support member 20, and a scan member 30. The support member 20 is mounted on the body 10, and the scan member 30 is arranged on the end of the support member 20 opposite the body 10.

The body 10 is substantially rectangular in shape and is configured for coupling to a platform (not shown). The body 10 includes a top wall 11, a bottom wall 13 opposite to the top wall 11, and four side walls 15 connecting the top wall 11 and the bottom wall 13. The top wall 11 includes a power lamp 111, a warning lamp 113, and a scan zone 115. In at least one embodiment, the power lamp 111 shines red so that the reader 100 will know the power lamp 111 is working normally; the warning lamp 113 shines blue to instruct that the reader 100 has successfully read information. The scan zone 115 is configured to be placed over electronic tags and barcodes to be scanned by the scan member 30. One of the side walls 15 has a power connector 151 and a data connector 153. The power connector 151 is configured for connecting to an external power source; the data connector 153 is configured for connecting to an external device, laptop computers or personal computers for example, for controlling the reader 100.

In at least one embodiment, the top wall 11 is made of an acrylic material for protecting the inside of the body 10. The bottom wall 13 and the side walls 15 are made of an aluminum alloy material for better heat dissipation.

The support member 20 is a substantially curled column connecting the body 10 and the scan member 30. The support member 20 includes a main section 21, a connecting section 23 and a mounting section 25. The main section 21 is hollow for receiving cables (not shown) electrically connecting the body 10 and the scan member 30. The connecting section 23 supports the support member 20 upwardly on the body 10. The mounting section 25 is substantially an inclined plane for mounting the scan member 30 and positioning the scan member 30 to align with the scan zone 115. In at least one embodiment, an angle between the main section 21 and the mounting section 25 is an acute angle.

Figure 3:
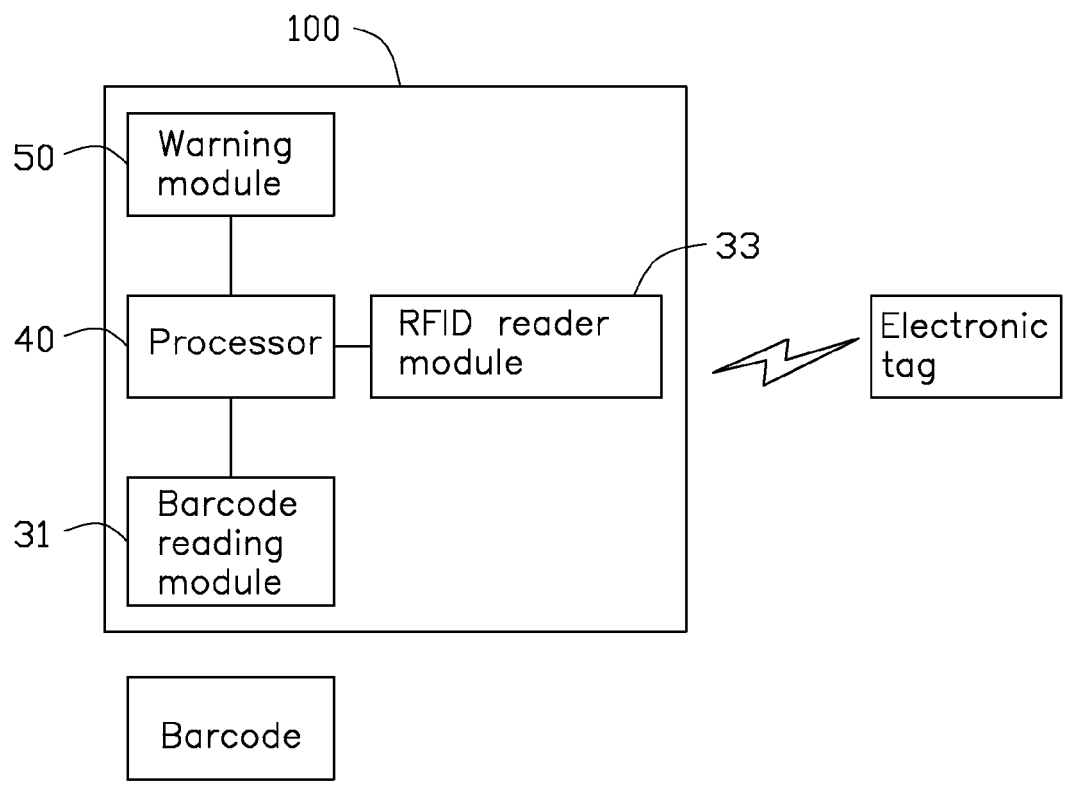
FIG. 3 is a block diagram of an embodiment of the reader.

FIG. 3 illustrates that the scan member 30 is configured for reading information from electronic tags and barcodes. The scan member 30 includes a barcode reading module 31 and a RFID reader module 33. The barcode reading module 31 is configured for reading information of the barcodes. The RFID reader module 33 is configured for reading information of the electronic tags and writing the barcode information read from the barcode reading module 31 to the electronic tags. The RFID reader module 33 can read information from high frequency electronic tags, ultrahigh frequency electronic tags, and 2.4 G active electronic tags. The barcode reading module 31 can be an infrared scanner. The RFID reader module 33 can be a RFID antenna.

FIG. 3 illustrates that the reader 100 further includes a processor 40 and a warning module 50. The processor 40 and the warning module 50 are received in the body 10. The processor 40 is electrically connected to the barcode reading module 31, the RFID reader module 33, and the warning module 50. The processor 40 receives information read by the barcode reading module 31 and the RFID reader module 33 and transmits the barcode information of the barcode reading module 31 to the RFID reader module 33.

The warning module 50 is configured for informing users whether the RFID reader module 33 writes the barcode information to the electronic tags. The warning module 50 is electrically connected to the warning lamp 113. When the RFID reader module 33 successfully writes barcode information to an RFID tag, the warning lamp 113 lights up, and the warning module 50 emits warning signals, such as making a first type of sound. If not, the warning lamp 113 goes out, and the warning module 50 emits notice signals, such as a second type of sound, thereby informing the user to repeat writing the barcode information.

The reader 100 can operate as follows: the reader 100 is connected to a power source and the power lamp 111 shines red. The scan zone 115 is placed over a barcode and an electronic tag. When the reader 100 reads information of the barcodes, the processor 40 controls the barcode reading module 31 to emit infrared to read information from the barcodes, the barcode reading module 31 transmits the barcode information to the processor 40. When the reader 100 reads information of the electronic tag, the processor 40 controls the RFID reader module 33 to transmit a wireless signal. The electronic tag receives the wireless signal from the RFID reader module 33 and feeds back a wireless signal with electronic information of the electronic tag to the RFID reader module 33. The RFID reader module 33 then transmits the wireless signal with the electronic information to the processor 40, thus reading information of the electronic tag.

When the reader 100 writes the barcode information into the electronic tag, the processor 40 processes the barcode information and converts the barcode information into information having a format corresponding to the information of the electronic tag, and transmits the converted information to the RFID reader module 33. The RFID reader module 33 transmits a wireless signal with the barcode information to the electronic tag, thus writing the barcode information into the electronic tag. In at least one embodiment, the processor 40 processes and converts the barcode information into a format that corresponds to the RFID information, thereby the barcode information can be stored in the electronic tag.

The reader 100 includes the barcode reading module 31 and the RFID reader module 33, which can read barcode and electronic tag information, the RFID reader module 33 can further write the barcode information to the electronic tag; therefore, the reader 100 is multifunctional. In addition, the scan member 30 is aligned to the scan zone 115, the user only places the scan zone 115 over barcodes and electronic tags, which is convenient to use.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A reader comprising:
a body comprising a scan zone configured to be placed over at least one of a barcode and an electronic tag, the scan zone being arranged in an end of a top wall of the body; and
a scan member slantingly mounted on another end of the top wall of the body opposite to the scan zone and aligned to the scan zone, the scan member comprising:
a barcode reading module configured for reading barcode information from the barcode; and
a RFID reader module configured for reading electronic information from the electronic tag and writing the barcode information into the electronic tag;
a support member connecting the body and the scan member, wherein the support member comprises a main section, a connecting section, and a mounting section, the connecting section and the mounting section are arranged on opposite ends of the main section, the connecting section supports the support member upwardly on the body;
wherein the mounting section is substantially an inclined plane, the scan member is mounted on the mounting section;
wherein an angle between the main section and the mounting section is an acute angle;
wherein the body comprises a bottom wall opposite to the top wall, the top wall comprises a power lamp and a warning lamp;
wherein the body further comprises four side walls connecting the top wall and the bottom wall, one of the side walls defines a power connector and a data connector, when the power connector is connected to an external power source, the power lamp lights up; the data connector is configured for connecting to an external device.

2. The reader as claimed in claim 1, further comprising a processor, wherein the processor is electrically connected to the barcode reading module and the RFID reader module, the processor is configured for receiving the barcode information from the barcode reading module and the electronic information from the RFID reader module; the processor further processes the barcode information and transmits to the RFID reader module.

3. The reader as claimed in claim 2, further comprising a warning module, wherein the warning module is electrically connected to the processor and the warning lamp, when the RFID reader module successfully writes the barcode information into the electronic tags, the warning lamp lights up, and the warning module emits a warning signal; if not, the warning lamp goes out, and the warning module emits another warning signal.

4. The reader as claimed in claim 2, wherein the processor processes and converts the barcode information into a format that corresponding to the electronic information, thereby the barcode information is capable of being stored in the electronic tag.

5. The reader as claimed in claim 1, wherein the barcode reading module is an infrared scanner, the RFID reader module is a RFID antenna.

6. A reader comprising:
a body comprising a scan zone configured to be placed over at least one of a barcode and an electronic tag, the scan zone being arranged in an end of a top wall of the body;
a support member upwardly mounted on another end of the top wall of the body opposite to the scan zone and comprising an inclined plane; and
a scan member mounted on the inclined plane and aligned to the scan zone, the scan member comprising:
a barcode reading module configured for reading barcode information from the barcode; and
a RFID reader module configured for reading RFID information from the electronic tag and writing the barcode information into the electronic tag;
a support member connecting the body and the scan member, wherein the support member comprises a main section, a connecting section, and a mounting section, the connecting section and the mounting section are arranged on opposite ends of the main section, the connecting section supports the support member upwardly on the body;
wherein the mounting section is substantially the inclined plane, the scan member is mounted on the mounting section;
wherein an angle between the main section and the mounting section is an acute angle;

wherein the body comprises a bottom wall opposite to the top wall, the top wall comprises a power lamp and a warning lamp;

wherein the body further comprises four side walls connecting the top wall and the bottom wall, one of the side walls defines a power connector and a data connector, when the power connector is connected to an external power source, the power lamp lights up; the data connector is configured for connecting to an external device.

7. The reader as claimed in claim 6, further comprising a processor, wherein the processor is electrically connected to the barcode reading module and the RFID reader module, the processor is configured for receiving the barcode information from the barcode reading module and the electronic information from the RFID reader module; the processor further processes the barcode information and transmits to the RFID reader module.

8. The reader as claimed in claim 7, further comprising a warning module, wherein the warning module is electrically connected to the processor and the warning lamp, when the RFID reader module successfully writes the barcode information into the electronic tags, the warning lamp lights up, and the warning module emits a warning signal; if not, the warning lamp goes out, and the warning module emits another warning signal.

9. The reader as claimed in claim 7, wherein the processor processes and converts the barcode information into a format that corresponding to the electronic information, thereby the barcode information is capable of being stored in the electronic tag.

10. The reader as claimed in claim 6, wherein the barcode reading module is an infrared scanner, the RFID reader module is a RFID antenna.

* * * * *